Oct. 2, 1923.
E. BOLGER
1,469,616
OILING DEVICE
Filed June 10, 1921
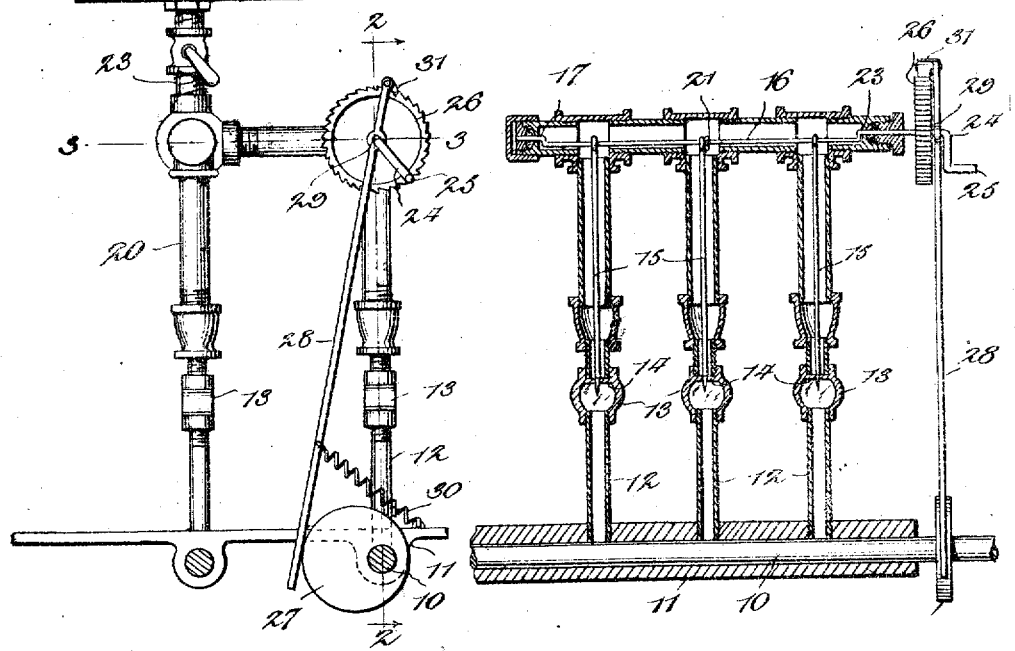

Patented Oct. 2, 1923.

1,469,616

UNITED STATES PATENT OFFICE.

EDWARD BOLGER, OF NEW YORK, N. Y.

OILING DEVICE.

Application filed June 10, 1921. Serial No. 476,553.

*To all whom it may concern:*

Be it known that I, EDWARD BOLGER, a citizen of the United States, residing at New York city, in the county of New York and State of New York, have invented new and useful Improvements in Oiling Devices, of which the following is a specification.

This invention relates to oiling devices for engines, automobiles and the like, and the principal object is to provide a valve mechanism having valve rods movable up and down therein to prevent clogging of the valves.

Another object is to provide means whereby said rods may be reciprocated.

Another object is to provide automatic drive means for said reciprocating means.

With these and incidental objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of an oiling system embodying my invention.

Figure 2 is a vertical section on line 2—2 of Figure 1.

Figure 3 is a horizontal section on line 3—3 of Figure 1.

Like characters of reference refer to like parts in all views.

Referring to the drawing in detail, 10 represents the main drive shaft of an engine, or any other shaft which it is desired to lubricate. The numeral 11 designates a portion of the bearing and framework above the shaft, on which is supported a number of lubricating oil feed pipes 12 each of which comprises a pair of nipples or short lengths of pipe connected by a turnbuckle-like coupling 13 which may be fitted with a glass tube through which the oil drops from one nipple to the other. The upper portion of each member 13 forms a valve by having a horizontal web pierced centrally as at 14.

A valve rod 15 projects down through each aperture 14, all of the rods 15 being hung loosely on the crank pin 16 of a crank shaft 17. By rotating shaft 17, the rods 15 may be raised and lowered so as to prevent gathering of dust or clogging of the oil in apertures 14.

A second crank shaft is shown at 18 and is provided with other rods 19 operating in pipes 20. A link 21 connects the two crank shafts, so that when one is operated, the other will also be operated. More shafts may be connected in like manner if desired. An oil tank or reservoir is shown at 22 and leads into a pipe 23 which communicates with all of the oil feed pipes, and the ends of which form bearings for shaft 17.

Outside of pipe 23, shaft 17 is provided with a hanger 24 and crank 25, and if the device is to be hand operated, this is all the mechansm provided. In that case the oiler or attendant gives the crank 25 a few turns every little while. But when automatic means is to be used, there is also fastened on shaft 17 a ratchet wheel 26, and on the drive shaft 10 a cam 27 is secured. A lever 28 is pivoted at 29, and has its lower end forced against cam 27 by a spring 30. On its upper end lever 28 carries a pawl 31 to operate ratchet 26. It is obvious that the rotation of the cam will effect rotation of the ratchet and connected parts. The proportion of the elements of lever 28 will determine the relative speed of the oil pins.

Obviously either rotary or oscillatory movements may be used. By adjusting members 16 up and down the tapered valve rods 15 render the flow of oil greater or less.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed is:—

1. In combination with a driving shaft, an oiling system comprising a plurality of vertical oil pipes, a valve in each of said pipes, a rod in each of said valves, a horizontally disposed pipe having connection with the vertical pipes, a crank mounted in said horizontally disposed pipe and having operative connection with said rods to intermittently open the valve.

2. The combination with a plurality of shafts, an oiling system comprising a plurality of vertical oil pipes communicating with said shafts and rising therefrom, a valve seat in each of said pipes, a valve stem adapted to co-act with said valve seat, horizontally disposed pipes communicating with said vertical oil pipes, and a crank mounted in said horizontally disposed pipes and having operative connection with said valve rods to intermittently open the valves, a reservoir for supplying oil to said pipes, and means on one end of said crank for manually or automatically operating said crank.

3. The combination with a plurality of shafts, an oiling system comprising a plurality of vertical oil pipes communicating with said shafts and rising therefrom, a valve seat in each of said pipes, a valve stem adapted to co-act with said valve seat, horizontally disposed pipes communicating with said vertical oil pipes, and a crank mounted in said horizontally disposed pipes and having operative connection with said valve rods to intermittently open the valves, a pipe connecting said horizontally disposed pipes, a link passing through said pipe and connecting said cranks, a reservoir for supplying oil to said pipes, and means on one end of said crank for manually or automatically operating said crank.

4. The combination with a plurality of shafts, an oiling system comprising a plurality of vertical oil pipes communicating with said shafts and rising therefrom, a valve seat in each of said pipes, a valve stem adapted to co-act with said valve seat, horizontally disposed pipes communicating with said vertical oil pipes, and a crank mounted in said horizontally disposed pipes and having operative connection with said valve rods to intermittently open the valves, a pipe connecting said horizontally disposed pipes, a link passing through said pipe and connecting said cranks, a reservoir for supplying oil to said pipes, means for regulating the flow of oil from said reservoir, and means on one end of said crank for manually or automatically operating said crank.

5. An oiling system comprising a plurality of vertical pipes, a valve in each of said pipes and co-operative with said valve, a horizontal pipe having connection with said vertical pipes, a crank mounted in said horizontal pipe and having operative connection with said rods to intermittently open said valves, means on one end of said crank for operating the same, and a reservoir for supplying oil to said pipes as and for the purpose specified.

In testimony whereof I have affixed my signature.

EDWARD BOLGER.